United States Patent [19]

TeWinkle

[11] Patent Number: 5,519,514
[45] Date of Patent: May 21, 1996

[54] COLOR SENSOR ARRAY WITH INDEPENDENTLY CONTROLLABLE INTEGRATION TIMES FOR EACH COLOR

[75] Inventor: Scott L. TeWinkle, Ontario, N.Y.

[73] Assignee: Xerox Corporation, Stamford, Conn.

[21] Appl. No.: 447,320

[22] Filed: May 22, 1995

[51] Int. Cl.⁶ .................................................. H04N 1/04
[52] U.S. Cl. ........................................... 358/514; 358/515
[58] Field of Search ................................ 358/513–515, 358/482, 483, 486, 494, 474; 250/208.1; 348/295, 306, 273–275; H04N 1/04

[56] References Cited

U.S. PATENT DOCUMENTS

| | | | |
|---|---|---|---|
| 4,663,535 | 5/1987 | Nakai et al. | 250/578 |
| 4,837,614 | 6/1989 | Omi | 358/75 |
| 4,985,760 | 1/1991 | Maeshima et al. | 358/514 |
| 5,148,268 | 9/1992 | Tandon et al. | 358/41 |
| 5,300,767 | 4/1994 | Steinle et al. | 250/208.1 |
| 5,336,878 | 8/1994 | Boyd et al. | 250/208.1 |
| 5,416,611 | 5/1995 | Tandon | 358/486 |

*Primary Examiner*—Kim Yen Vu
*Attorney, Agent, or Firm*—R. Hutter

[57] ABSTRACT

In a color input scanner for deriving digital signals from a full-color original image, a sensor bar having three parallel arrays of photosensors, each array being sensitive to a different primary color, is moved relative to the original image in a scan direction. With each scan cycle, the exposure of the photosensors in each array is precisely timed so that the optical "center of gravity" for each exposed area in the original image is superimposed for all of the primary color photosensors.

15 Claims, 7 Drawing Sheets

COLOR SENSOR ARRAY WITH INDEPENDENTLY CONTROLLABLE INTEGRATION TIMES FOR EACH COLOR

This application incorporates by reference U.S. Pat. No. 5,148,268, assigned to the assignee hereof.

The present invention relates to color image sensor arrays, and more particularly to an "electronic shuttering" arrangement for ensuring that, in each scan cycle, each of a plurality of primary-color-filtered photosensors are exposed to the same location on an original image being scanned.

Monochrome image sensor arrays typically comprise a linear array of photodiodes which raster scan an image bearing document and convert the microscopic image area viewed by each photodiode to image signal charges. Following an integration period, the image signals are amplified and transferred to a common output line or bus through successively actuating multiplexing transistors.

U.S. Pat. No. 5,148,268 discloses a color image sensor array for recording full-color original images as digital data. This patent shows separate linear arrays of photosensors arranged in parallel on a single sensor bar, and caused to move in a scan direction relative to the original image generally perpendicular to the direction of the arrays. The photosensors in each array are provided with a filter thereon of one primary color. As the sensor bar including the three rows of photosensors moves along the original image, each portion of the area of the original image is exposed to each of the rows of photosensors. As each filtered row of photosensors moves past each particular area in the original image, signals according to the different primary color separations of that area are output by the particular photosensors in each row. In this way, three separate sets of signals, each relating to one primary color, will be produced by the linear arrays of photosensors.

U.S. Pat. No. 4,663,535 discloses a contact-type color image sensor having three photosensitive cell arrays, each array being filtered with a red, green, or blue filter.

U.S. Pat. No. 4,837,614 discloses a color image sensor with three different sets of photoelectric elements, each provided with a different primary-color filter. For each photoelectric element having a particular primary-color filter, two other photoelectric elements corresponding to the same pixel location are used to obtain a second color datum for the pixel of interest. This second color datum can be used for correction of color balance.

U.S. Pat. No. 5,300,767 discloses an optical scanning device having multiple photosensor arrays, each filtered with a different color.

U.S. Pat. No. 5,336,878 discloses a single-pass color optical scanner which produces multiple color component images of each scan line at different times, but which is capable of selective scaling of image data through adjustment of the scanning speed.

One practical difficulty with a sensor bar having three parallel linear arrays of photosensors is that, with every scan of the three arrays of photosensors, each of the three rows may not "look" at precisely the same area of the original image. The separation of the primary color-filtered rows of photosensors may create a time-lag of signals output from each of the three rows. Because the bar is typically moving continuously relative to the original image, it is likely that each of the three rows will be exposed to a slightly different area within a particular scan line of the original image.

The present invention is directed toward manipulating the integration times, or the "electronic shuttering," of individual linear arrays of photosites in a full-color bar to cause the exposed areas of an original image to be more closely aligned along the direction of the sensor bar. In this way, image quality is improved because each of the primary color photosensors passing past a particular small area on the original image will in fact be viewing the same small area in the image.

According to one aspect of the present invention, there is provided a method of operating a raster input scanner comprising a sensor bar having a first linear array of photosensors and a second linear array of photosensors parallel to the first linear array. The sensor bar is moved relative to an object being scanned in a scan direction substantially perpendicular to the linear arrays, with the first linear array leading and the second linear array following. For each of a series of scan cycles as the sensor bar moves, there is caused an integration of image signals from the photosensors of the first linear array, each integration having a first exposure duration. For each of a series of scan cycles as the sensor bar moves, there is caused integration of image signals from the photosensors of the second linear array, the integration of the second linear array having a second exposure duration less than the first exposure duration and starting during the first exposure duration.

According to another aspect of the present invention, there is provided a method of operating a raster input scanner comprising a sensor bar having a first linear array of photosensors and a second linear array of photosensors parallel to the first linear array. The sensor bar is moved relative to a series of center points on an object being scanned in a scan direction substantially perpendicular to the linear arrays, with the first linear array leading and the second linear array following. Each center point corresponds to a scan cycle as the sensor bar moves. For each of a series of scan cycles, there is caused an integration of image signals from the photosensors of the first linear array, each integration having a first exposure duration and causing an area of the object being scanned to be centered on the center point along the scan direction. For each of a series of scan cycles, there is caused an integration of image signals from the photosensors of the second linear array. The integrations of the second linear array have a second exposure duration less than the first exposure duration, and cause an area of the object being scanned to be centered on the center point along the scan direction.

According to another aspect of the present invention, there is provided a method of operating a raster input scanner comprising a sensor bar having a first, second, and third linear array of photosensors parallel to one another. Each array is sensitive to a different primary color. The sensor bar is moved relative to an object being scanned in a scan direction substantially perpendicular to the linear arrays. For each of a series of scan cycles as the sensor bar moves, there is caused an integration of image signals from the photosensors of the first linear array, each integration having a first exposure duration. For each of a series of scan cycles as the sensor bar moves, there is caused integration of image signals from the photosensors of the second linear array, the integration of the second linear array having a second exposure duration lasting $2/3$ of the first exposure duration and starting at $2/3$ of the first exposure duration. For each of a series of scan cycles as the sensor bar moves, there is caused integration of image signals from the photosensors of the third linear array, the integration of the third linear array having a third exposure duration $1/3$ of the first exposure duration and starting after the second exposure duration.

Figure 6:
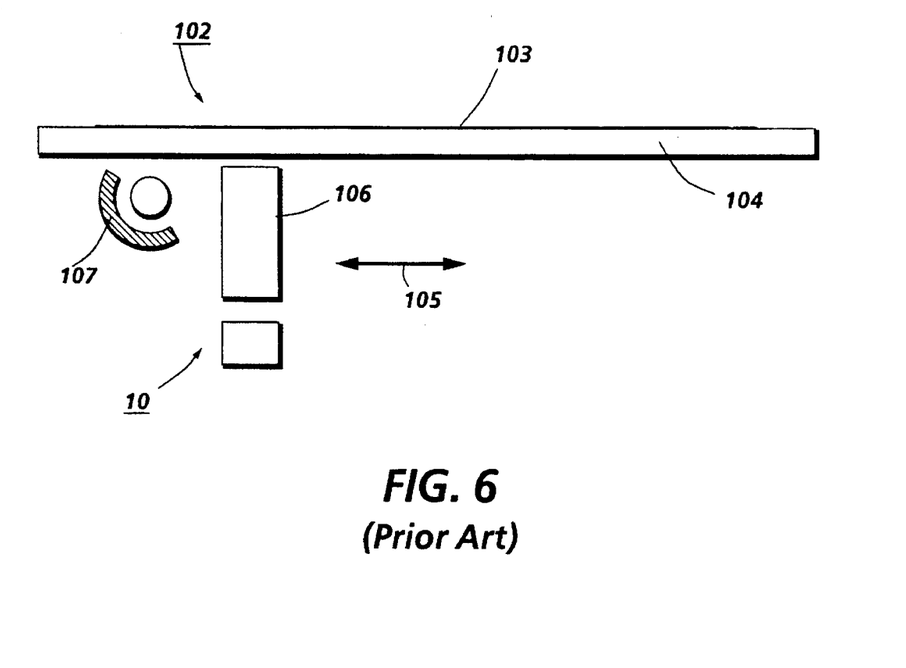
FIG. 6 is a schematic view of a raster input scanner having a full width array.

Referring to FIG. 6, there is shown an exemplary raster input scanner, designated generally by the numeral 102, of the type adapted to use a scanning array, or sensor bar, 10. Sensor bar 10 comprises a linear full width array having a scan width in the fast scan direction substantially equal to or slightly greater than the width of the largest document 103 or other object to be scanned. Documents to be scanned are supported on a generally rectangular transparent platen 104, typically glass, sized to accommodate the largest original document 103 to be scanned. A document 103 to be scanned is located either manually or by a suitable automatic document handler or feeder (not shown) on platen 104 for scanning. Array 10 is supported for reciprocating scanning movement in the scan direction depicted by arrows 105 below platen 104 by a movable scanning carriage (not shown). A lens 106 focuses array 10 on a line like area extending across the width of platen 104. One or more lamp and reflector assemblies 107 are provided for illuminating the line-like area on which array 10 is focused.

Figure 7:
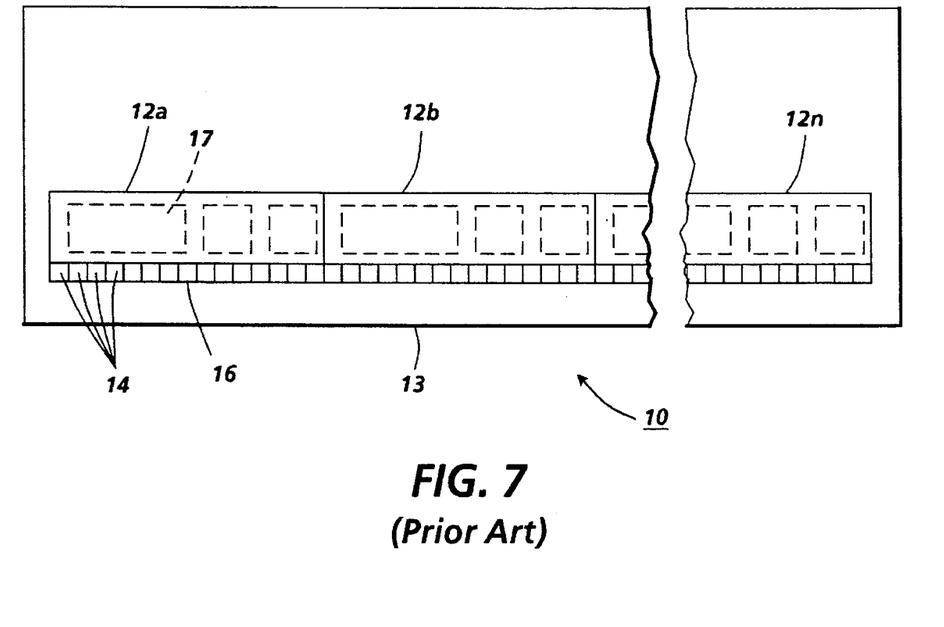
FIG. 7 is a top view illustrating a full width color array of the type fabricated by abutting a plurality of chips of the present invention together.

Referring to FIG. 7, there is shown a long or full width sensor bar 10 composed of a plurality of smaller sensor chips 12 assembled together end-to-end (specific chips are identified by numerals 12a, 12b, . . . 12n) on an elongated generally rectangular rigid substrate 13.

Chips 12, which may, for example, be charge coupled devices (CCDs) or MOS sensor arrays, are relatively thin silicon dies having a generally rectangular shape. A row 16 of photosite areas 14 parallel the longitudinal axis of the chips. While a single row 16 of photosite areas 14 is shown, plural photosite area rows may be contemplated. Other active elements such as shift registers, gates, pixel clock, etc., (designated generally by the numeral 17 herein) are preferably formed integrally with chips 12. Suitable external connectors (not shown) are provided for electrically coupling the chips 12 to related external circuitry.

In the case of color scanning, the individual photosite areas are subdivided into three photodiodes, enabling the photosite areas to detect three different wavelength ranges. Normally, these comprise the three primary colors, i.e., blue, green, and red. While the invention is described in the context of the three primary colors, the invention is not limited to those colors or color combination. Other colors and color combinations such as cyan, magenta and yellow, etc. may instead be envisioned. Also, while a three color sensor is disclosed, color sensors containing photodiodes of any number may be envisioned.

Figure 8:
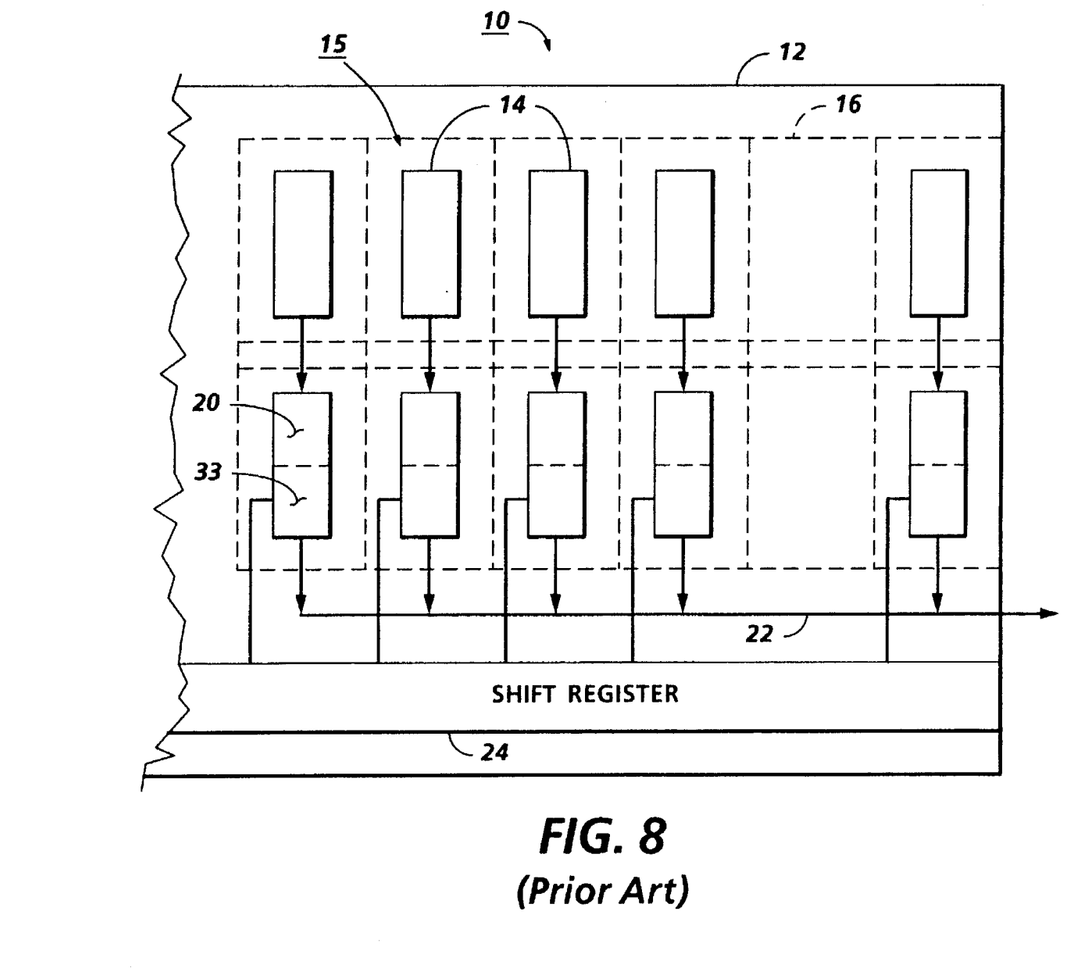
FIG. 8 is a schematic view of an image sensor bar having an array of photosite cells, each cell having a photodiode area with a two stage transfer circuit and an amplifier for transferring image signal charges from the photodiode areas to a common output bus.

Referring to FIG. 8, there is shown the color image sensor bar with two stage transfer, designated generally by the numeral 10. Sensor bar 10 includes a base or chip 12 of silicon with a plurality of photosite areas 14 thereon. Photosite areas 14 are in closely spaced in juxtaposition with one another on chip 12 in a linear array or row 16. As previously mentioned, several smaller arrays can be abutted together end to end with one another to form a longer array, i.e. a full width or contact array, with spacing between the photodiodes at the butted ends the same as the spacing between the photodiodes inside the chip, thereby maintaining a consistent photodiode pitch across the entire full width of the composite array.

Figure 1:
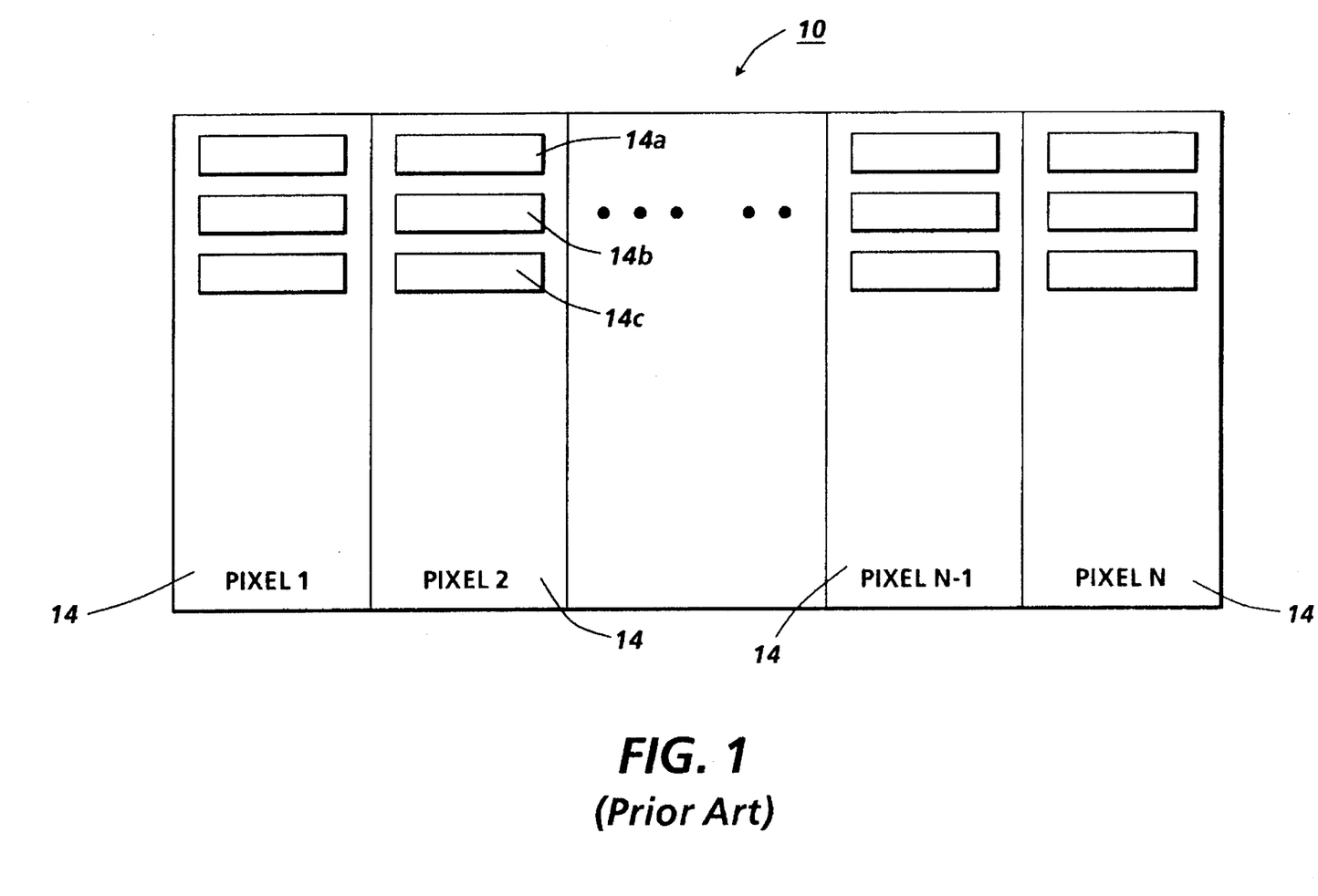
FIG. 1 is a plan view of photosite areas of a sensor bar.

Referring to FIG. 1, each photosite area 14 on a sensor bar 10 includes photodiodes 14a, 14b, 14c representing the three primary colors. While photodiodes 14a, 14b, 14c are shown and described herein, other photosite types such as amorphous silicon or transparent electrode MOS type photosites may be envisioned. Further, while a one dimensional sensor array having a single row 16 of photosite areas 14 is shown and described herein, a two dimensional sensor array with plural rows of photosite areas may be contemplated.

Figure 2:
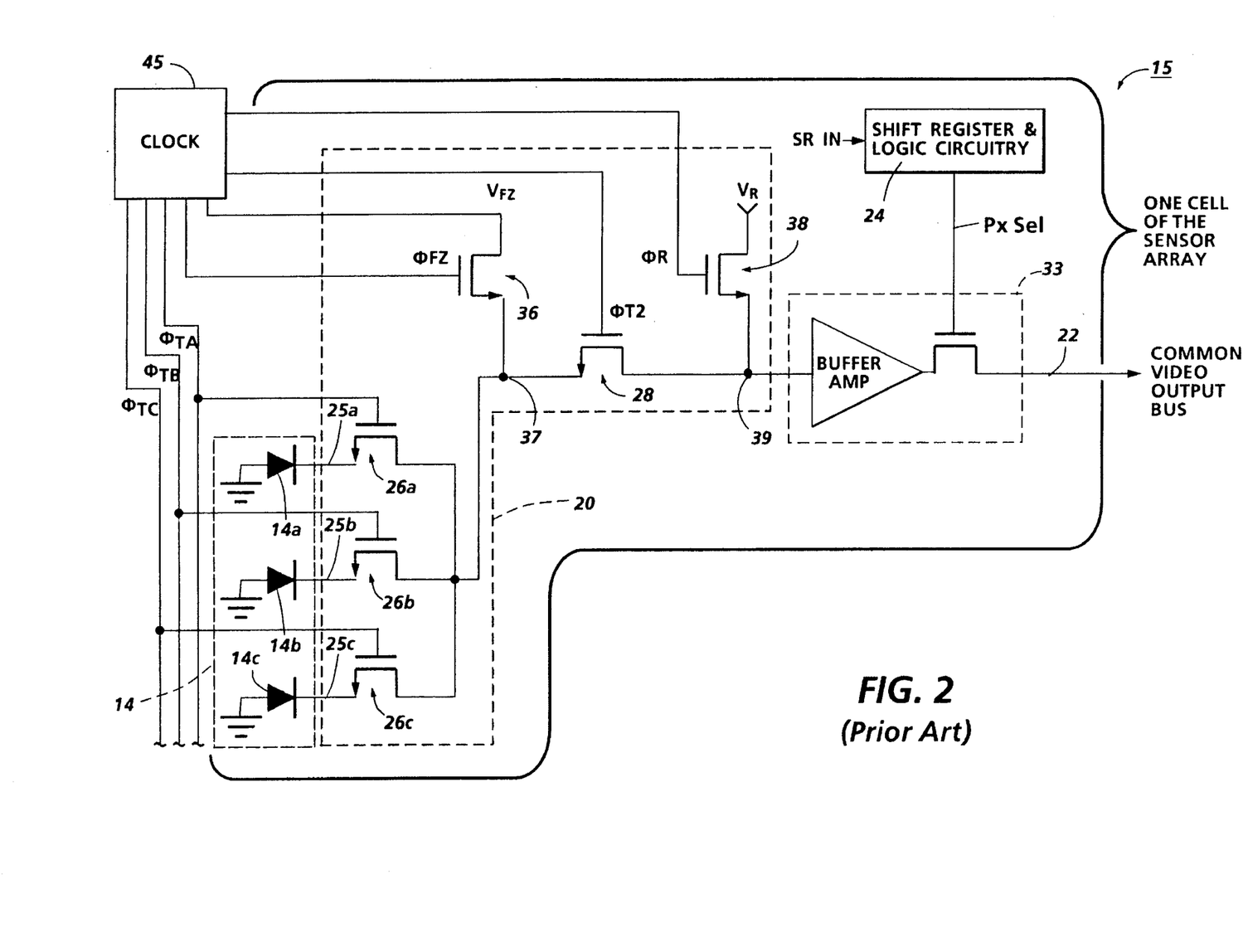
FIG. 2 is a circuit schematic showing a pixel cell.

Referring to FIG. 2, each photosite area 14 has a two stage transfer circuit 20 associated therewith which together with the photodiode area and an amplifier 33 form a photosite cell 15 at the array front end. In each cell 15, the image signal charge from the photodiode area is transferred by circuit 20 to amplifier 33 where the image signal charge from photodiode area 14 is amplified to bring the image signal charge to a desired potential level prior to transferring the charge to a common video output line or bus 22. Suitable shift register and logic circuitry 24 provide timing control signals PxSel for connecting each pixel cell 15 to bus 22 in the proper timed sequence.

Sensor bar 10 may for example be used to raster scan a document original, and in that application, the document original and the sensor array 10 are moved or stepped relative to one another in the slow scan direction perpendicular to the linear axis of array 10. At the same time, the array scans the document original line by line in the fast scan direction parallel to the linear axis of the array. The image line being scanned is illuminated and light from the document is focused onto the photodiodes in photodiode area 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

The two stage transfer circuit 20 associated with each cell 15 has first-stage transfer transistors 26a, 26b, 26c, and a second-stage transfer transistor 28 for transferring the image signal charge from the photodiodes 14a, 14b, 14c to amplifier 33. Transistors 26a, 26b, 26c are in series with lines 25a, 25b, 25c connecting one electrode of photodiodes 14a, 14b, 14c with the input gate of amplifier 33. The other electrode of photodiodes 14a, 14b, 14c is grounded. A bias charge injection transistor 36 is provided to inject a bias charge, for example, an electrical fat zero $V_{FZ}$, to line 25 at middle node 37. A reset transistor 38 controls the reset voltage $V_R$ at the node 39 between transistor 28 and amplifier 33.

A suitable clock 45 provides a suitable source pulses $\Phi_R$, $\Phi_{IA}$, $\Phi_{IB}$, $\Phi_{IC}$, $\Phi_{I2}$, $\Phi_{FZ}$, and $V_{FZ}$. Pulses $\Phi_{IA}$, $\Phi_{IB}$, $\Phi_{IC}$, $\Phi_{FZ}$, and $V_{FZ}$ provide for injection of the bias charge into lines 25a, 25b, 25c and pulses $\Phi_{I2}$ and $\Phi_R$ for setting node 39 to voltage $V_R$. As will appear, pulses $\Phi_{IA}$, $\Phi_{IB}$, $\Phi_{IC}$, of different amplitude are provided for transferring the image signal charges from photodiodes 14a, 14b, 14c to amplifiers 33. The PxSel signals used for multiplexing the amplified charge output by amplifier 33 onto the common video output bus 22 are provided by shift register and logic circuitry 24.

In operation, pulse $\Phi_R$ actuates reset transistor 38 to apply reset voltage $V_R$ to node 39 to reset the input to amplifier 33. Subsequently, pulse $\Phi_{tA}$ and $\Phi_{t2}$ actuate transistors 26a and 28 respectively of two stage transfer circuit 20 to transfer the image signal charge accumulated on the photodiode 14a of each cell 15 to amplifiers 33. To facilitate transfer of the image signal charges, the amplitude $V(\Phi_{tA1})$ of waveform $\Phi_{tA}$ is smaller than the amplitude $V(\Phi_{t2})$ of pulse $\Phi_{t2}$. During injection of the bias charge, the $\Phi_{tA}$ and $\Phi_{FZ}$ pulses go high while pulse $V_{FZ}$ goes low. Following preset intervals, the pulses $V_{FZ}$, $\Phi_{tA}$, and $\Phi_{FZ}$ return to their nominal level.

U.S. Pat. No. 5,148,268, the patent incorporated by a reference herein, explains in detail the operation of clock 45 for operating the transistors 26a–c, etc., in order to read out signals from the photodiodes 14a–c with each scan of the moving sensor bar. Briefly, it will be apparent that, as the sensor bar moves relative to a document or other object being scanned, each primary-color photosensor 14a–c in one cell 15 across the bar will be sequentially exposed to a particular location on the original document, and as each photodiode 14a–c is in turn exposed to the particular location on the document, the diode will accumulate charge proportional to the amount of that primary color in the portion of the original image, so that three charge signals, each corresponding to one primary color in the particular location, will be produced. In order to read out these three primary-color signals from the photodiodes 14a–c in a usable sequence on the video output bus 22, clock 45 operates the various transistors in the transfer circuit 20, generally as indicated in the patent incorporated by reference.

With particular relevance to the present invention, the important parameters which are ultimately controlled by the action of clock 45 involve the integration of charges accumulated on the primary-color photosensors 14a–c of each cell 15 across a sensor bar. The integration of these charges represents the transference of a charge having a particular magnitude (which relates directly to the amount of primary color for a particular location in the original image being scanned) through the transfer circuit 20 and on to the video bus 22. In brief, each photodiode 14a–c is available to receive light, which creates a charge thereon, at all times. In order to control an individual photodiode in a scanning process, the key parameter is the timing of events in which the particular photodiode is discharged, the discharge eventually forming the video image signal. As the sensor bar moves relative to the image being scanned, each individual photosensor for each primary color receives a certain amount of exposure time in which the particular photosensor is permitted to receive light from the particular location of the image being scanned; this principle is equivalent to opening a shutter to allow film to be exposed in a camera.

With every scan cycle, the photodiode is temporarily shut off in order to allow the charge accumulated thereon in the scan cycle to be read out through the transfer circuit 20. As used in the claims herein, the "integration" shall mean the portion of each scan cycle in which light from the image or object being scanned is permitted to charge a particular photodiode; the amount of time within each scan cycle in which this integration is permitted to take place is referred to as the "exposure duration." The longer the exposure duration, the more light will be permitted to create charge on the particular photodiode. With the fat-zero injection system in the preferred embodiment of the present invention, the start and end of each exposure duration is determined by the function of the transfer circuit 20: each exposure duration begins when a fat-zero bias is injected onto the particular photodiode, and the exposure duration ends when the associated transistor 26 causes the discharge of the photodiode, transferring the charge through transfer circuit 20 onto the reset node 39.

Figure 3:
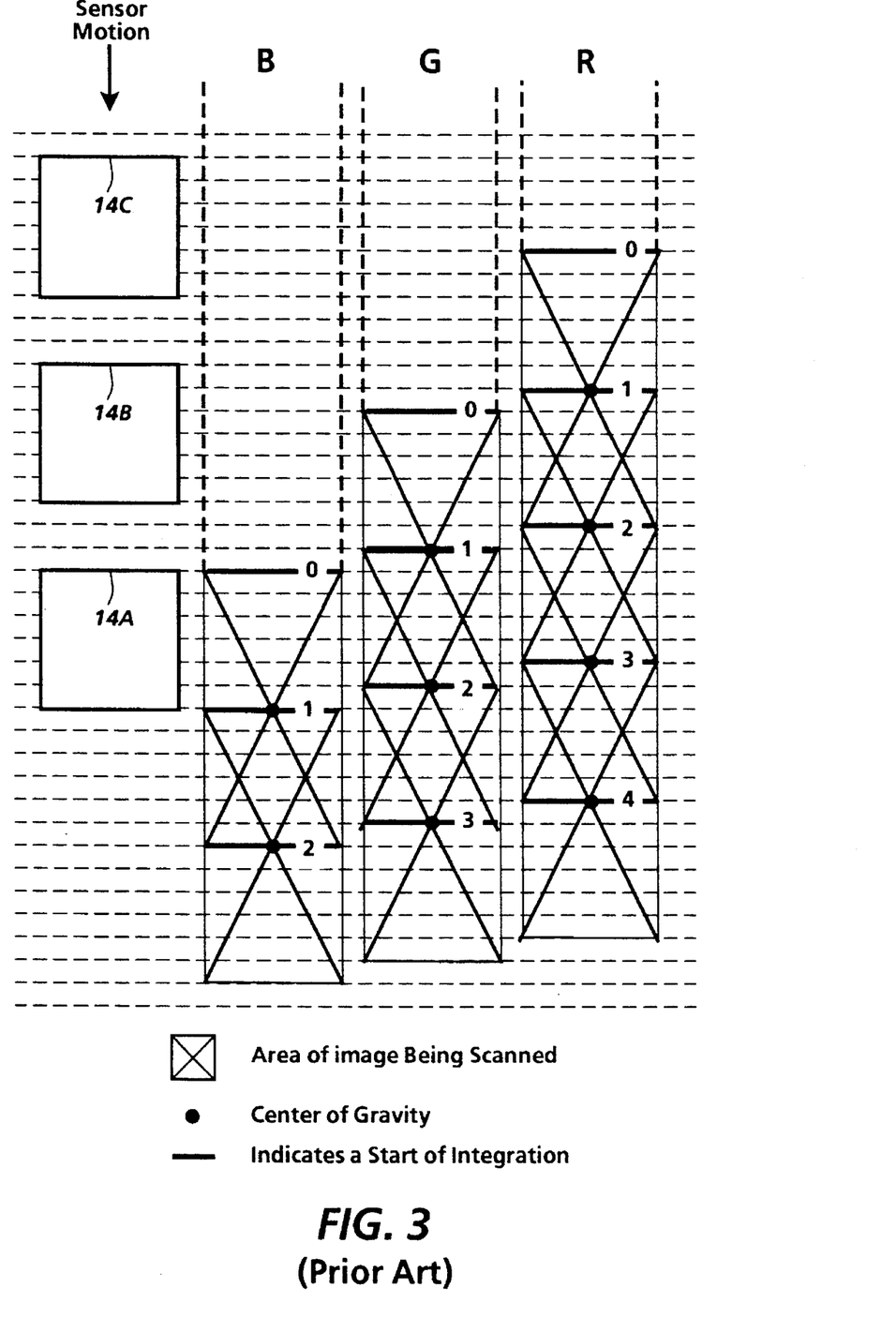
FIG. 3 is a plan view showing representative photodiodes in a pixel cell, in comparison with a chart showing the behavior of each photodiode relative to the surface of an image being scanned, according to a prior-art technique of reading out signals from the photodiode.

FIG. 3 is a diagram showing the relative positions of areas on a hard-copy image being scanned by one set of photodiodes 14a–c, in a prior-art arrangement. As illustrated in the Figure, the three photodiodes 14a–c are represented by squares which correspond to the relative size and spacing of the photosensitive areas associated with a photodiode found in a typical design of a sensor bar. Each of the photodiodes 14a–c is assigned a primary color with which it is filtered and which causes the photosensor to be sensitive to only that primary color: photodiode 14a is filtered blue, 14b is filtered green, and 14c is filtered red. Further illustrated in the Figure are three columns, corresponding to areas along the scan direction (downward in the Figure) of an original image being scanned by a particular photodiode with the passage of time. Although the areas corresponding to different colors are shown as separate columns, it will be apparent that in a real situation, the three columns are in fact superimposed and follow the same path relative to an image or object being scanned. In the Figure, however, the behavior of the three photodiodes corresponding to blue, green, and red are illustrated in separate columns for clarity.

In the Figure, with the three photodiodes moving continuously downward to scan the original image, each heavy horizontal line within each column represents the timing at which an exposure duration for a particular photodiode begins. The "X" drawn immediately below each heavy horizontal line indicates the extent of the area of the image being scanned by that particular photodiode which begins its exposure duration at the heavy horizontal line. The dot placed at the center of each X in the Figure represents the center point, or "center of gravity," of the particular small area of the image being scanned with each exposure duration: this is an important concept when exposing a plurality of overlapping areas of an original image with different photodiodes. The fact that the areas encompassed by each X are larger than the area corresponding to an individual photodiode is a result of the fact that each of the photodiodes 14a–c is "on" (exposing an area of the original image being scanned) for a particular exposure duration while the photodiodes are continuously moving relative to the image being scanned.

The horizontal dashed lines in the Figure show the relative positions of the areas being scanned: the space between each horizontal dashed line is here intended to represent one-sixth of a scan line corresponding to a scan cycle for the sensor bar. As can be seen in the Figure, each photosensor represented by a photodiode 14a–c encompasses a full scan line (6 horizontal dashed lines) in the vertical direction as shown, and a border thereof is spaced from the border of another photodiode by one-half a scan line, or three horizontal dashed lines as shown. This particular spacing is typical of spacing required by the creation of photosensors on an integrated circuit.

For each cell 15 in the sensor bar, including three photodiodes 14a–c, each corresponding to one primary color, there must be a routine for reading out each of the photodiodes in a coherent sequence. In prior-art systems, it is known to read out the color photodiodes 14a–c in simple serial fashion: first one photodiode such as 14a is permitted to discharge its signal onto video bus 22, and then after 14a is read out, then photodiode 14b, and photodiode 14c are read out, with each individual photodiode being allotted the same amount of integration time for each scan cycle. It can be seen in the Figure, however, that the serial, equal-exposure-duration technique of the prior art can, in a practical system, create a skew of the centers of gravity of images scanned by the succession of primary-color photodiodes moving downward in the Figure. With the heavy horizontal lines indicating the start of each scan, and the numbers attached to each heavy horizontal line indicating the sequence of exposure durations for each photodiode, the centers of gravity of the image portion being scanned (the three columns are in fact superimposed on the original image) are not aligned: for example the blue photodiode 14a is always scanning a location on the original image having a center of gravity slightly below that of the green photodiode in the second column, and also the red photodiode in the third column. This skew of centers of gravity for different primary colors may have an undesirable effect in the scanning of complicated original images such as photographs.

The independently-controllable exposure durations of the different arrays of primary-color photosensors of the present invention permit the timing and duration of exposures of each primary-color photodiode array to be finely adjusted, thereby enabling a system in which the center points, or centers of gravity, of the portions of the image being scanned by the different primary-color photodiode can be exactly aligned or superimposed.

Figure 4:
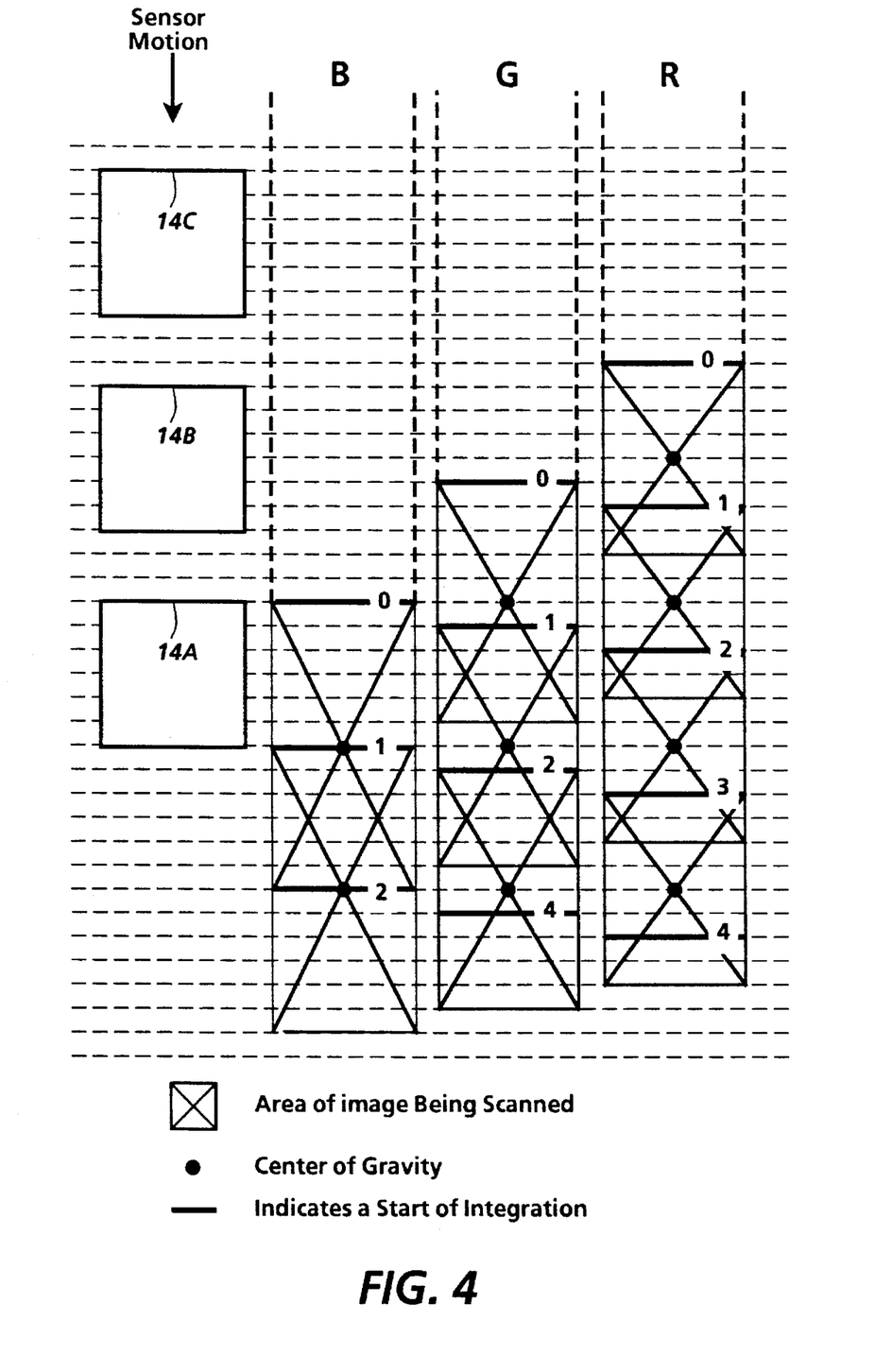
FIG. 4 is a plan view, analogous to FIG. 3, of a portion of an area being scanned, showing the behavior of a read out technique for the photodiodes according to one embodiment of the present invention.

FIG. 4 shows an arrangement in which the centers of gravity of the areas being scanned by each primary-color photodiode are made perfectly aligned (because the three illustrated columns are in fact superimposed, the centers of gravity are exactly the same location on the original image). To obtain this alignment of the centers of gravity of the image areas being scanned by each primary-color photodiode (by comparison of the X's formed by image areas being scanned by the different photodiodes), the blue photodiode 14a, which forms the leading edge of the sensor bar relative to the image being scanned, is allotted a longer exposure duration than the green photodiode 14b. The red photodiode 14c is alotted an even shorter exposure duration than the green photodiode 14b. The effect of the progressively shorter exposure durations of the green and red photodiode is that the green and red photodiode scan slightly smaller areas than the blue photodiode 14a which forms the leading edge of the sensor bar.

In total effect, the purpose of progressively shortening the "later" green and red photodiodes is to make up for the dead space between the adjacent photodiodes, represented by three spaces formed by the horizontal lines between the photodiodes 14a–c in the scan direction. It will be further noted that the exposure duration for each of the later photodiodes start later in time than the blue photodiode and end earlier, all for the purpose of making the centerpoint, or center of gravity, of the location of the image being scanned by each photodiode the exact same location. The integrations of the photodiodes 14b have an exposure duration less than the photodiodes 14a, and cause an area of the object being scanned to be centered on the same center point along the scan direction.

Figure 5:
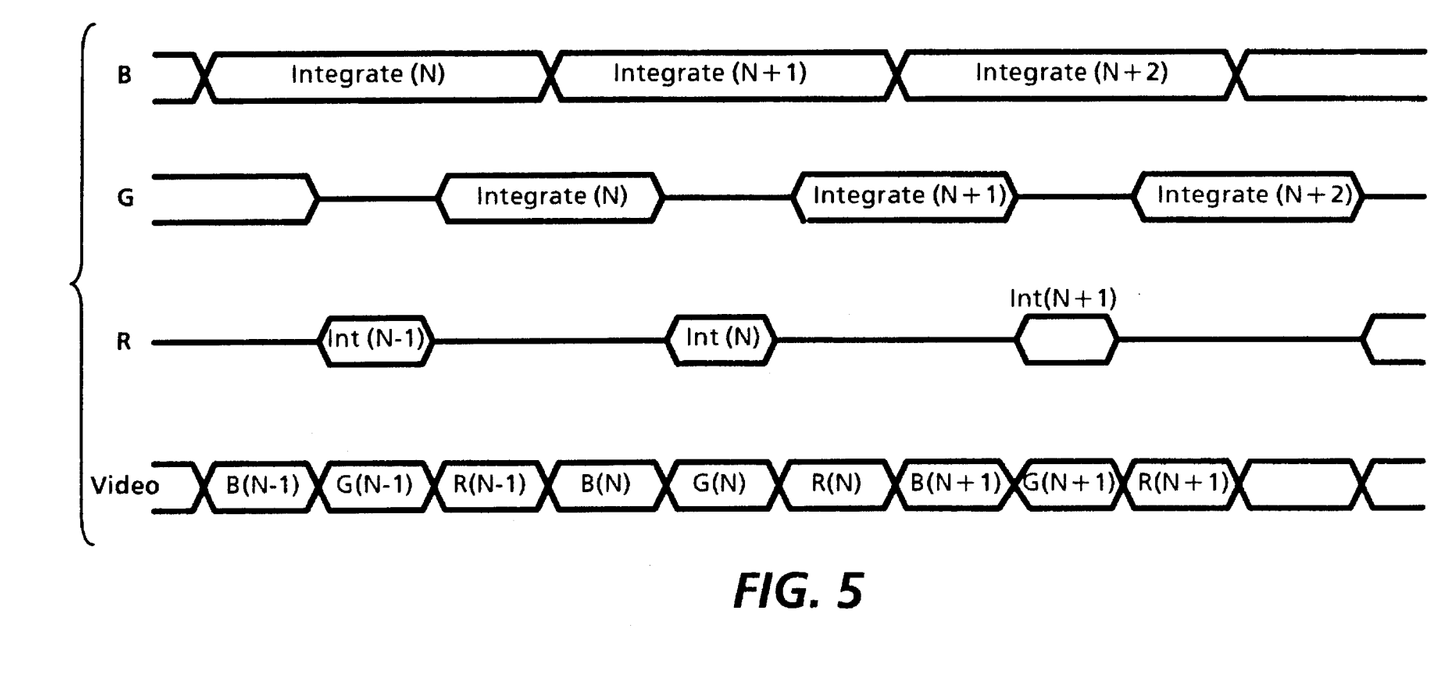
FIG. 5 is a comparative timing diagram illustrating the operation of different primary-color photodiodes and the associated video line in order to perform the read out technique illustrated in FIG. 4.

In order to obtain the desired relative shortening of exposure durations of photosensors from the leading to the following ends of the sensor bar, the clock 45 controlling the bias injection and discharge of the individual photodiodes 14a–c can be controlled for relatively precise control of the exposure durations. FIG. 5 shows a timing scheme for the exposure durations of the primary-color photodiodes to obtain the alignment of centers of gravity of images being scanned in FIG. 4. In the preferred embodiment of the present invention, using a fat-zero bias injection, the exposure durations are determined by the injection of the fat-zero bias to begin and the discharge of the photodiode to end, but the diagram shown in FIG. 5 can be applied to other systems of controlling photodiodes. The exposure duration for a particular photodiode in time is given by the "thick" portion of each line in the timing diagram. The reference letters N, N+1, N+2, etc. in each integration period shown in FIG. 5 correspond to different portions of the image being scanned. At the bottom of FIG. 5 is shown the output on the video line 22, indicating the signals output by the set of three primary-color photodiodes when the image is allowed to be read out through a transfer circuit such as 20.

Analyzing FIG. 5, it can be seen that for the leading-edge blue photodiode, relatively long integration periods are provided, one essentially immediately following another. For each of these scan cycles represented by the long integration times of the blue photodiode, the exposure duration for the second photodiode in the sensor bar, here the green photodiode, is intended to begin at about the ⅔ point in the course of the exposure duration of the blue photodiode. This green exposure duration in turn lasts for ⅔ of the blue exposure duration. Finally, the last-place photodiode in the sensor bar, here the red photodiode, is given an exposure duration which is ⅓ that of the leading-edge blue photodiode and further which does not begin until the end of the exposure duration for the green photodiode. Thus, for all three primary-color photodiodes, the beginning of each exposure duration is staggered by ⅔ of the longest exposure duration, and that the exposure durations become progressively shorter so that the relative proportion of exposure durations are 1, ⅔, and ⅓. (Returning to FIG. 4, the reason that relative lengths of the scanned areas for the three diodes, in numbers of horizontal lines, are 12:10:8 and not 1:2/3:1/3 is because of the finite length in the scan direction of the photodiodes and spaces therebetween.)

Looking at the video line, representing the output on video line 22 when the image signals are read out from the photodiodes, it can be seen that a regular pattern of video signals is output, regardless of the exposure duration of the particular photodiode. Also, the read-out signal on the video line essentially immediately follows the ending of the exposure duration from the particular photodiode.

The fact that different primary-color photodiodes have substantially different exposure durations even when scanning the same original image need not have a detrimental effect on the quality of the image signal read out from the system. Indeed, in one practical embodiment of the present invention, the longer exposure duration for the blue photodiode has been found to compensate neatly for the lower light transmissive properties of the blue filter being used. At any rate, differences in signal values caused by different exposure durations for different primary colors can be corrected downstream of the sensor in image-processing apparatus.

While the invention has been described with reference to the structures disclosed, it is not confined to the details set forth, but is intended to cover such modifications or changes as may come within the scope of the following claims.

I claim:

1. A method of operating a raster input scanner comprising a sensor bar having a first linear array of photosensors sensitive to a first color and a second linear array of photosensors sensitive to a second color different from the first color parallel to the first linear array, comprising the steps of:

moving the sensor bar relative to an object being scanned in a scan direction substantially perpendicular to the linear arrays, with the first linear array leading and the second linear array following;

for each of a series of scan cycles as the sensor bar moves, causing integration of image signals from the photosensors of the first linear array, each integration having a first exposure duration; and for each of a series of scan cycles as the sensor bar moves, causing integration of image signals from the photosensors of the second linear array, the integration of the second linear array having a second exposure duration less than the first exposure duration and starting during the first exposure duration.

2. The method of claim 1, further comprising the steps of:

injecting a bias on each of the photosensors of the first linear array with each scan cycle; and injecting a bias on each of the photosensors of the second linear array with each scan cycle.

3. The method of claim 1, wherein the bar includes a third linear array of photosensors, having a filter of a third color thereon, disposed following the second linear array when the bar is moved in the scan direction, and further comprising the step of:

with each scan cycle, causing integration of image signals from the photosensors of the third linear array as the bar moves, the integration of the third linear array having a third exposure duration less than the second exposure duration and starting after the start of the second exposure duration.

4. The method of claim 3, wherein the third exposure duration starts after the second exposure duration with each scan cycle.

5. The method of claim 4, wherein the photosensors in the first linear array and the photosensors in the second linear array each encompass a sensor length along the scan direction, and a border of the photosensors in the first linear array is spaced one-half a sensor length from a border of the photosensors in the second linear array.

6. The method of claim 5, wherein the second exposure duration is about ⅔ the first exposure duration and the third exposure duration is about ⅓ the first exposure duration.

7. The method of claim 6, wherein the second exposure duration starts at about ⅔ of the first exposure duration and the third exposure duration starts after the second exposure duration with each period.

8. A method of operating a raster input scanner comprising a sensor bar having a first linear array of photosensors sensitive to a first color and a second linear array of photosensors sensitive to a second color different from the first color parallel to the first linear array, comprising the steps of:

moving the sensor bar relative to a series of center points on an object being scanned in a scan direction substantially perpendicular to the linear arrays, with the first linear array leading and the second linear array following, each center point corresponding to a scan cycle as the sensor bar moves;

for each of a series of scan cycles, causing integration of image signals from the photosensors of the first linear array, each integration having a first exposure duration and causing an area of the object being scanned to be centered on the center point along the scan direction; and for each of a series of scan cycles, causing integration of image signals from the photosensors of the second linear array, the integration of the second linear array having a second exposure duration less than the first exposure duration and causing an area of the object being scanned to be centered on the center point along the scan direction.

9. The method of claim 8, further comprising the steps of:

injecting a bias on each of the photosensors of the first linear array with each scan cycle; and injecting a bias on each of the photosensors of the second linear array with each scan cycle.

10. The method of claim 8, wherein the bar includes a third linear array of photosensors, having a filter of a third color thereon, disposed following the second linear array when the sensor bar is moved in the scan direction, and further comprising the step of:

for each of a series of scan cycles, causing integration of image signals from the photosensors of the third linear array, the integration of the third linear array having a third exposure duration less than the second exposure duration and causing an area of the object being scanned to be centered on the center point along the scan direction.

11. The method of claim 10, wherein the third exposure duration starts after the second exposure duration with each scan cycle.

12. The method of claim 11, wherein the photosensors in the first linear array and the photosensors in the second linear array each encompass a sensor length along the scan direction, and a border of the photosensors in the first linear array is spaced one-half a sensor length from a border of the photosensors in the second linear array.

13. The method of claim 11, wherein the second exposure duration is about ⅔ the first exposure duration and the third exposure duration is about ⅓ the first exposure duration.

14. The method of claim 13, wherein the second exposure duration starts at about ⅔ of the first exposure duration and the third exposure duration starts after the second exposure duration with each period.

15. A method of operating a raster input scanner comprising a sensor bar having a first, second, and third linear arrays of photosensors arranged parallel to one another, each of the linear arrays being sensitive to a different primary color, comprising the steps of:

moving the sensor bar relative to an object being scanned in a scan direction substantially perpendicular to the linear arrays;

for each of a series of scan cycles as the sensor bar moves, causing integration of image signals from the photosensors of the first linear array as the bar moves, each integration having a first exposure duration;

for each of a series of scan cycles as the sensor bar moves, causing integration of image signals from the photosensors of the second linear array, the integration of the second linear array having a second exposure duration lasting ⅔ of the first exposure duration and starting at ⅔ of the first exposure duration; and for each of a series of scan cycles as the sensor bar moves, causing integration of image signals from the photosensors of the third linear array, the integration of the third linear array having a third exposure duration ⅓ of the first exposure duration and starting after the second exposure duration.

* * * * *